April 24, 1951     E. W. DAVIS     2,550,535
MEASURING VALVE
Original Filed Aug. 26, 1942
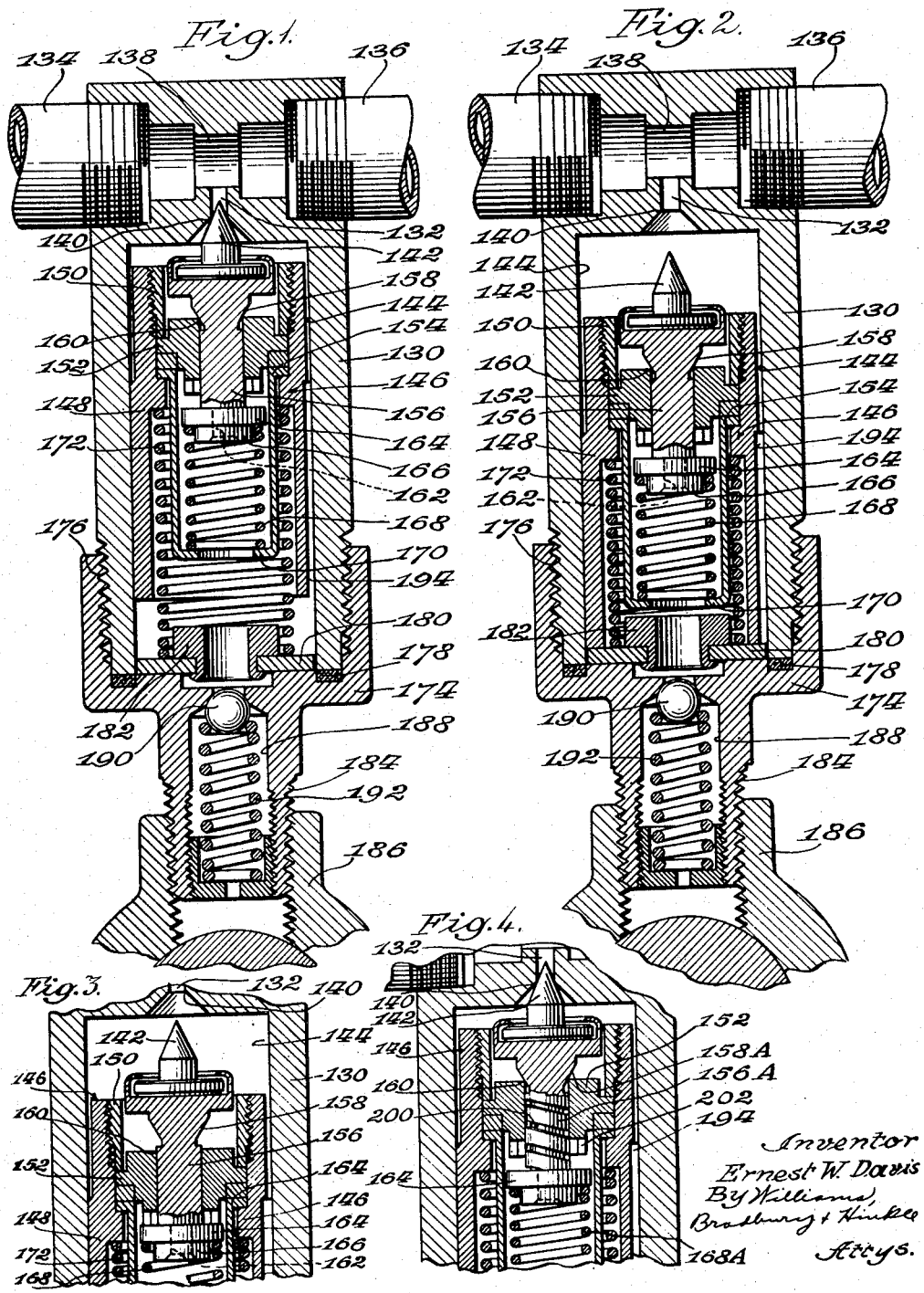

Patented Apr. 24, 1951

2,550,535

UNITED STATES PATENT OFFICE 2,550,535

MEASURING VALVE

Ernest W. Davis, River Forest, Ill., assignor to Stewart-Warner Corporation, Chicago, Ill., a corporation of Virginia Original application August 26, 1942, Serial No. 456,281. Divided and this application October 6, 1945, Serial No. 620,761

4 Claims. (Cl. 184—7)

My invention relates to measuring valves and more particularly to measuring valves for centralized lubricating systems.

In centralized lubricating systems, lubricant from a central source such as a lubricant compressor is forced through a piping system having branches arranged in parallel and connected to the various bearings to be supplied with lubricant from the central source. The different bearings may have the same or different lubrication requirements and it is common to provide the branches of the lubricating system with measuring valves or other metering means for insuring the supply of just the proper amount of lubricant to each bearing.

My invention relates to measuring valves intended to be used in such a lubricating system and an object of my invention is to provide a new and improved measuring valve which will accurately meter a predetermined quantity of lubricant under all operating conditions of the lubricating system.

Another object of my invention is to provide a measuring valve which is economical to manufacture and which will provide long service without attention or repair.

Another object of my invention is to provide a new and improved measuring valve which can be readily installed by a person without special training or instruction.

Another object of my invention is to provide a new and improved measuring valve which is particularly adapted for use in lubricating systems which do not include accumulators.

Other objects and advantages of my invention will become apparent as the description proceeds.

In the drawings:

Fig. 1 is a longitudinal sectional view through a measuring valve embodying one form of my invention and illustrating this measuring valve as being connected to a bearing and to the piping of a centralized lubricating system;

Fig. 2 is a view similar to Fig. 1, but showing the parts of the measuring valve in different positions;

Fig. 3 is a partial view similar to Fig. 1 but showing the parts in a third position, and Fig. 4 is a partial longitudinal view of a modified form of measuring valve.

This application is one of two divisional applications based on my parent application Serial No. 456,281, filed August 26, 1942, and now abandoned. Said parent application and the other divisional application Serial No. 620,339, filed October 4, 1945, show measuring valves which are particularly adapted for but not limited to use in lubricating system having accumulators in the pipe lines. In some instances where the accumulators are omitted, the pistons of the measuring valve of such other applications move upwardly a slight distance when a subsequent measuring valve initiates its operation and reduces the line pressure, serving to cause lubricant to pass downwardly through the bypass for the measuring valve piston so as to increase slightly the amount of lubricant underneath the piston. When under these circumstances a subsequent measuring valve completes its operation and the maximum line pressure is again established, the piston of the first measuring valves moves downwardly again to lowermost position, but this return movement is accompanied by the discharge of a very small additional quantity of lubricant to the bearing. Under these circumstances, this additional supply of lubricant is objectionable, and in this application I have shown forms of measuring valves which overcome this objection.

In the measuring valve of Figs. 1, 2, and 3, the valve body 130 has an inlet 132 adapted to be connected to the pipe line represented by pipes 134 and 136 and connecting passage 138. The inlet 132 has a valve seat 140 of small diameter and this seat is normally engaged by a tapered valve 142.

The body 130 has a cylindrical bore 144 adapted to communicate with the inlet 132. A piston indicated generally by reference numeral 146 is located in the cylindrical bore 144. This piston includes a pair of tubular members 148 and 150 threadedly secured together and clamping a head 152 and depending sleeve 154 therebetween. The piston 146 includes pressure relief means comprising a cylindrical member 156 slidable in the head 152 and having a tapered surface 158 adapted to engage the annular edge 160 to form a lubricant tight seal between the member 156 and the head 152. The valve 142 is loosely mounted in the upper end of the member 156 and the lower end of this member has a reduced end 162 which forms a rivet for securing to the member 156 washers 164 and 166.

A spring 168 is confined between the washer 164 and the in-turned end 170 of the depending tube 154 and urges the pressure relief member 156 upwardly as viewed in Fig. 1. The spring 168, however, is of lesser strength than the spring 172 which urges the piston 146 upwardly and holds the valve 142 in sealing engagement with the seat 140 as shown in Fig. 1.

The lower end of the body 130 is closed by a cap 174 which is threaded thereto as indicated at 176 and a sealing gasket 178 is clamped between the cap and adjacent end of the body 130. A sealing washer 180 is urged against the cap 174 by spring 172 and this sealing washer 180 carries a tubular guide 182 which serves to position the lower end of the spring 172.

The cap 174 is provided with a threaded nipple 184 adapted to be screwed to a bearing 186. A passage 188 connects the interior of the body 130 with the bearing surfaces and a ball check valve 190 normally closes this passage. The check valve spring 192 is relatively weak so that the check valve 190 offers only slight resistance to the flow of lubricant to the bearing 186.

When the lubricant pressure in the pipe line increases sufficiently to move valve 142 away from seat 140, the entire upper end of the piston 146 is exposed to the line pressure and this piston and its associated parts move downwardly to the position shown in Fig. 2. During this downward movement of the piston, the lubricant beneath the piston is discharged past check valve 190 to the bearing 186. When the piston reaches the downward limit of its stroke, the lower end of the piston engages the sealing washer 180 and forms a seal therewith which prevents a flow of lubricant to the bearing through piston bypass 194.

When a succeeding measuring valve initiates its operation, there is an immediate drop in the line pressure and in the pressure of the lubricant immediately above the piston of the first measuring valve which is then in the position shown in Fig. 2. The lubricant between the piston of this first valve and the check valve 190 may still be under high pressure. Grease and similar lubricants are slightly compressible and the reduction in pressure above the piston of the first measuring valve permits the grease located beneath this piston to expand.

In the embodiment of Fig. 1, this expansion of grease beneath the piston 146 urges relief member 156 upwardly from the position shown in Fig. 2 to the position shown in Fig. 3 and such upward movement of the relief member 156 is sufficient to equalize the lubricant pressure on opposite sides of the piston 146 and thus overcome any tendency of the lubricant therebeneath to raise this piston from its sealing engagement with washer 180. This equalization of pressure is effected without any change in the amount of the lubricant underneath the piston, since there is nothing to oppose the upward movement of the relief member 156 quickly, whereas an upward movement of the piston 146 would be slow by reason of the necessity for lubricant to pass through the bypass 194. When the succeeding measuring valve completes its operation and the line pressure again increases, the pressure relief member returns to the position shown in Fig. 2 but this return of the pressure relief member 156 merely increases the pressure of the lubricant beneath the piston to its previous maximum and is not accompanied by the discharge of additional lubricant to the bearing 186.

In the modification of Fig. 4, the pressure relief member 156A which corresponds to the member 156 of Figs. 1, 2, and 3, is provided with a helical groove 200. When the relief member 156A is in its lower position relative to piston head 152, the upper end of the passage provided by helical groove 200 is closed since the surface 158A of the member 156A forms a seal with the annular edge 160 of the piston head. However, when the member 156A moves upwardly relative to this piston head to a position like that shown in Fig. 3, the upper end of the helical groove 200 is in open communication with the space above the piston, and lubricant below the piston can flow upwardly through the helical groove and thus equalize the pressure on opposite sides of this piston.

In other words, in the embodiment of Fig. 3, the equalization of pressure is effected by the displacement resulting from movement of the pressure relief member 156. In Fig. 4, the displacement of the relief member 156A only partially equalizes the lubricant pressure on the opposite sides of the piston and complete equalization is effected by flow through the groove 200. The reduction in line pressure due to operation of a subsequent valve is of an exceedingly short duration and the normal line pressure is resumed before spring 172 could initiate return of the measuring valve piston.

After all of the measuring valves have completed their operative strokes and the line pressure is relieved, the measuring valve pistons will return to the positions shown in Fig. 4. During this return movement, lubricant can bypass the piston by way of helical groove 200 as well as bypass 194 since the spring 168A is given such strength that the relief member 156A will be in the raised position during this return movement of the piston. The lower end of head 152 is grooved as indicated at 202 so that engagement of washer 164 with the lower end of this head will not close helical passage 200.

It is to be understood that my invention is not limited to the particular details shown and disclosed, but may assume numerous other forms not specifically illustrated or described herein. The scope of my invention is defined by the following claims.

I claim:

1. A measuring valve of the class described, comprising a body having a lubricant inlet provided with a valve seat and a cylinder communicating with said inlet, a hollow piston reciprocable in said cylinder, a valve means carried by said piston for co-acting with said seat, a spring for urging said piston and valve means toward said seat, by pass means for said piston, conduit means for connecting said cylinder with a bearing surface, a check valve in said conduit means for preventing return flow therethrough, a pressure relief member reciprocable in said piston, said member having a portion movably extending into the hollow portion of said piston whereby reciprocation of said member varies the capacity of the hollow portion of said member and thereby relieves pressure of lubricant in said piston and a spring interposed between said piston and said pressure relief member for moving the latter relative to said piston, said by-pass means being separate and distinct from said pressure relief member.

2. In a measuring valve of the class described, the combination of a body having a lubricant inlet provided with a valve seat and a cylinder communicating with said inlet, a hollow piston reciprocable in said cylinder, a valve for said seat, a spring for urging said piston and valve toward said seat, a pressure relief member reciprocable in said piston and having a part extending into the hollow portion of said piston whereby movement of said member varies the capacity of said hollow part of the piston and thereby relieves lubricant pressure therein, said member having a cylindrical part provided with a helical groove, said member also having valve means co-acting with said piston to prevent flow of lubricant through said groove in one position of said member, a spring interposed between said member and piston, and by-pass means for said piston separate and distinct from said pressure relief member, and a valved conduit for connecting said body with a bearing surface.

3. In a measuring valve of the class described, the combination of a body having a lubricant inlet provided with a valve openable under a predetermined lubricant pressure, a cylinder communicating with said inlet, a hollow piston reciprocable in said cylinder under a lubricant pressure less than said predetermined pressure, a spring for urging said piston toward said seat, a pressure relief member reciprocable in said piston, said member having a part provided with a groove and valve means co-acting with said piston to prevent flow of lubricant through said groove in one position of said member, a spring interposed between said member and piston, said member having a portion extending into the hollow part of said piston whereby movement of said member varies the lubricant capacity of said piston and thereby relieves lubricant pressure therein, by-pass means for said piston separate and distinct from said pressure relief member, and a conduit for connecting said body with a bearing surface.

4. A measuring valve of the class described, comprising a body having a lubricant inlet provided with a valve and a cylinder communicating with said inlet, a piston reciprocable in said cylinder, said piston having a head and a skirt, a spring for urging said piston toward said inlet, bypass means for said piston, conduit means for connecting said cylinder with a bearing surface, a pressure relief member reciprocable in said piston, said member extending through the head of said piston and having a part located in said skirt whereby movement of said member varies the lubricant capacity of said skirt and relieves lubricant pressure therein, and a spring interposed between said piston and said pressure relief member for moving the latter relative to said piston, said by-pass means being separate and distinct from said pressure relief member.

ERNEST W. DAVIS.

REFERENCES CITED

The following references are of record in the file of this patent:

UNITED STATES PATENTS

| Number | Name | Date |
|---|---|---|
| 1,652,764 | Cowles | Dec. 13, 1927 |
| 1,926,158 | Macomber | Sept. 12, 1933 |